United States Patent
Tran

(10) Patent No.: US 6,826,402 B1
(45) Date of Patent: Nov. 30, 2004

(54) PILOT BEACON TRIGGER ENHANCEMENT WITH HYSTERISIS

(75) Inventor: Scott Tran, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 650 days.

(21) Appl. No.: 09/788,973

(22) Filed: Feb. 20, 2001

(51) Int. Cl.[7] .......................... H04Q 7/20; H04Q 7/32
(52) U.S. Cl. ................ 455/438; 455/436; 455/437; 455/439; 455/440; 455/442; 455/432.1; 370/331; 370/332
(58) Field of Search .................... 455/432.1, 432.2, 455/422.1, 436, 437, 438, 439, 440, 441, 442, 443, 445, 517, 550.1, 403; 370/331, 332, 334

(56) References Cited

U.S. PATENT DOCUMENTS

| | | | |
|---|---|---|---|
| 5,422,933 A | * | 6/1995 | Barnett et al. .............. 455/439 |
| 6,026,301 A | * | 2/2000 | Satarasinghe ............... 455/436 |
| 6,075,990 A | * | 6/2000 | Shin ........................... 455/440 |
| 6,442,389 B1 | * | 8/2002 | Marcum ...................... 455/437 |

* cited by examiner

Primary Examiner—William Trost
Assistant Examiner—Keith Ferguson
(74) Attorney, Agent, or Firm—Carr LLP

(57) ABSTRACT

A method for providing wireless communications system providers to adjust when soft and hard handoffs occur relative to the signal strengths of surrounding antennae. This is achieved by providing two sets of parameters. The first set of parameters is used to adjust either hard or soft handoffs, and the second set of parameters are added as an offset to the first set of parameters to adjust the other handoff, thereby, allowing the wireless communications system providers system to adjust soft and hard handoffs independently.

34 Claims, 3 Drawing Sheets

PILOT BEACON TRIGGER ENHANCEMENT WITH HYSTERISIS

TECHNICAL FIELD

The invention relates generally to wireless communications systems and, more particularly, to control efficient indication of a suitable location to perform a handoff from a first antenna to a second antenna.

BACKGROUND

Wireless communications systems provide communication services using geographically dispersed Base Station Transceiver Systems (BTSs) comprising at least one antenna, but typically two, three, or more. Each antenna is capable of transmitting and receiving within a limited geographical service area and may be configured such that the service area is directional or generally concentric. The service area for a BTS is commonly referred to as a cell or a sector. Moreover, a plurality of BTSs are generally coupled to a Base Station Controller (BSC), and, likewise, a plurality of BSCs are generally coupled to a Mobile Switching Center (MSC). The MSC provides interfaces to the Public Switched Telephone Network (PSTN) and the Packet Data Switched Network (PDSN), and, together with the BTSs and BSCs, form a wireless network that provides wireless communications services within a service area.

Wireless communication systems may utilize any communication protocol, one of which is the Code Division Multiple Access (CDMA) protocol as defined by the TIA/EIA-95-B and the CDMA 2000 standards. CDMA is a technology employing low-powered radio transmission that utilizes a broad spectrum broadcast to ensure quality of the transmission.

The capacity of a CDMA system is dependent upon, among other things, the number of distinct mobile stations (MSs) that may be communicating with a BTS over a single carrier frequency. In an attempt to increase capacity, CDMA systems are typically deployed with multiple carrier frequencies overlaying a single service area. With overlaying frequency coverage, some MSs are serviced on one of the carrier frequencies while other MSs are serviced on other carrier frequencies. Moreover, any particular BTS or antenna typically provides communication services on a subset of the available carrier frequencies, resulting in a situation in which adjacent service areas may utilize different carrier frequencies.

As a result of the limited geographic coverage of an antenna and the differing carrier frequencies between service areas, the MS is frequently commanded to handoff from a first antenna to a second antenna when moving from the service area of the first antenna to the service area of the second antenna. If the MS communicates user data, such as voice transmissions, with the first and second antennae, both of which are controlled by a single BSC, on the same carrier frequency, the handoff is commonly referred to as a soft handoff. During soft handoffs, an MS generally communicates user data with the first antenna and the second antenna simultaneously to enhance the transmission before dropping the first antenna. The convention in this application is to refer to soft handoff as both, separately and in combination, the process and state of the second antenna being added to the mobile active set of the MS. The process of adding and removing an antenna from the mobile active set of the MS is well known to one of ordinary skill in the art and will not be discussed in further detail.

Furthermore, if the MS is: (1) required to switch to a different carrier frequency; (2) required to switch to an antenna or BTS controlled by a different BSC that is controlled by a same MSC (intra-MSC/inter-BSC); or (3) required to switch to an antenna or BTS controlled by a different BSC and a different MSC (inter-MSC/inter-BSC), the handoff is commonly referred to as a hard handoff. It is well known to one of ordinary skill in the art that during hard handoffs the MS generally only communicates user data with one antenna, i.e., the communication of user data generally switches instantaneously from the first antenna to the second antenna. The process of switching from one antenna to the second antenna is well known to one of ordinary skill in the art and will not be discussed in further detail.

When performing a hard handoff, the MS is typically commanded to handoff from a first antenna to a second antenna when the signal strength of the second antenna exceeds a predetermined threshold. One particular method of assisting the MS in a hard handoff from the first antenna to the second antenna is by the use of a pilot signal. Pilot signals are typically transmitted by either the BTS as part of a CDMA forward channel, which comprises a pilot channel, a synch channel, a paging channel, and a traffic channel, or by a pilot beacon unit, whose transmission generally comprises a pilot channel and a synch channel. The second BTS generally transmits the pilot signal if the first antenna and BTS utilize the same carrier frequency as the second antenna and BTS. A pilot beacon unit generally transmits the pilot signal if the first antenna and BTS utilize a different carrier frequency than the second antenna and BTS. The source of the pilot signal will be referred to as being transmitted by an antenna, regardless of whether the pilot signal originates from the BTS or pilot beacon unit. Furthermore, a pilot beacon unit, which is preferably co-located with the second antenna, is generally required if the carrier frequencies of adjacent antennae differ. The use of a pilot signal and a pilot beacon unit are well known to a person of ordinary skill in the art and, therefore, will not be discussed in further detail, except as required to describe the present invention.

More particularly, handoffs are generally performed when the pilot signal strength of the second antenna, measured as the ratio of energy per chip to the noise spectral density of the total received forward-link interference, commonly referred to as $E_c/I_0$, is equal to or exceeds a predetermined system parameter, and may occur in either an idle-state or a traffic-state. Generally, the MS continually monitors the strength of the pilot signal from the second antenna, $PS_2$ ($E_c/I_0$), and compares $PS_2(E_c/I_0)$ to the value of two system parameters.

The CDMA standards typically provide two system parameters, T_ADD and T_COM, both of which are used to assist in hard and soft handoffs. The MS typically receives and stores T_ADD and T_COM from the BTS and/or BSC. The MS requests handoff from a first antenna to a second antenna when the strength of the pilot signal from the second antenna, $PS_2(E_c/I_0)$, is greater than or equal to T_ADD. Furthermore, the MS also requests handoff from a first antenna to a second antenna when the difference between the strengths of the signals from the second and the first antenna, $PS_2(E_c/I_0)-PS_1(E_c/I_0)$, is greater than or equal to T_COM*0.5 dB.

For instance, an MS currently communicating with a first antenna having a pilot signal strength of $PS_1(E_c/I_0)$, monitors the signal strength of nearby antennae to determine when handoff is appropriate. A second antenna transmits to the MS a pilot signal with a strength of $PS_2(E_c/I_0)$. The MS compares $PS_2(E_c/I_0)$ with the system parameter T_ADD, and compares the difference of $PS_2(E_c/I_0)$ and $PS_1(E_c/I_0)$ with the system parameter T_COM*0.5 dB. If either $PS_2(E_c/I_0)$ is greater than or equal to T_ADD, or $PS_2(E_c/I_0)-PS_1(E_c/I_0)$ is greater than or equal to T_COM*0.5 dB, the MS requests a handoff from the first antenna to the second antenna.

Unfortunately, the system parameters T_ADD and T_COM assist both soft and hard handoffs. As a result, it is difficult for the service provider to adjust the T_ADD and T_COM values to obtain optimal performance for both hard and soft handoffs simultaneously. For instance, if the service provider optimizes T_ADD and T_COM for soft handoffs, hard handoff situations are generally adversely affected. Likewise, if the service provider optimizes T_ADD and T_COM for hard handoffs, soft handoff situations are generally adversely effected.

Therefore, there is a need, for one or more reasons discussed or nevertheless existing, for a method of optimizing when handoffs, soft and hard, occur.

SUMMARY

The present invention provides a method through which wireless communications service providers adjust when hard and soft handoffs occur individually relative to the signal strength of one or more antennae. The method preferably comprises using hysterisis parameters added as an offset to the handoff system parameters in the case of hard handoffs and using the handoff system parameters in the case of soft handoffs, thereby providing a mechanism to adjust hard and soft handoffs individually. Alternatively, the method comprises using hysterisis parameters added as an offset to the handoff system parameters in the case of soft handoffs and using the handoff system parameters in the case of hard handoffs, or a combination thereof.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
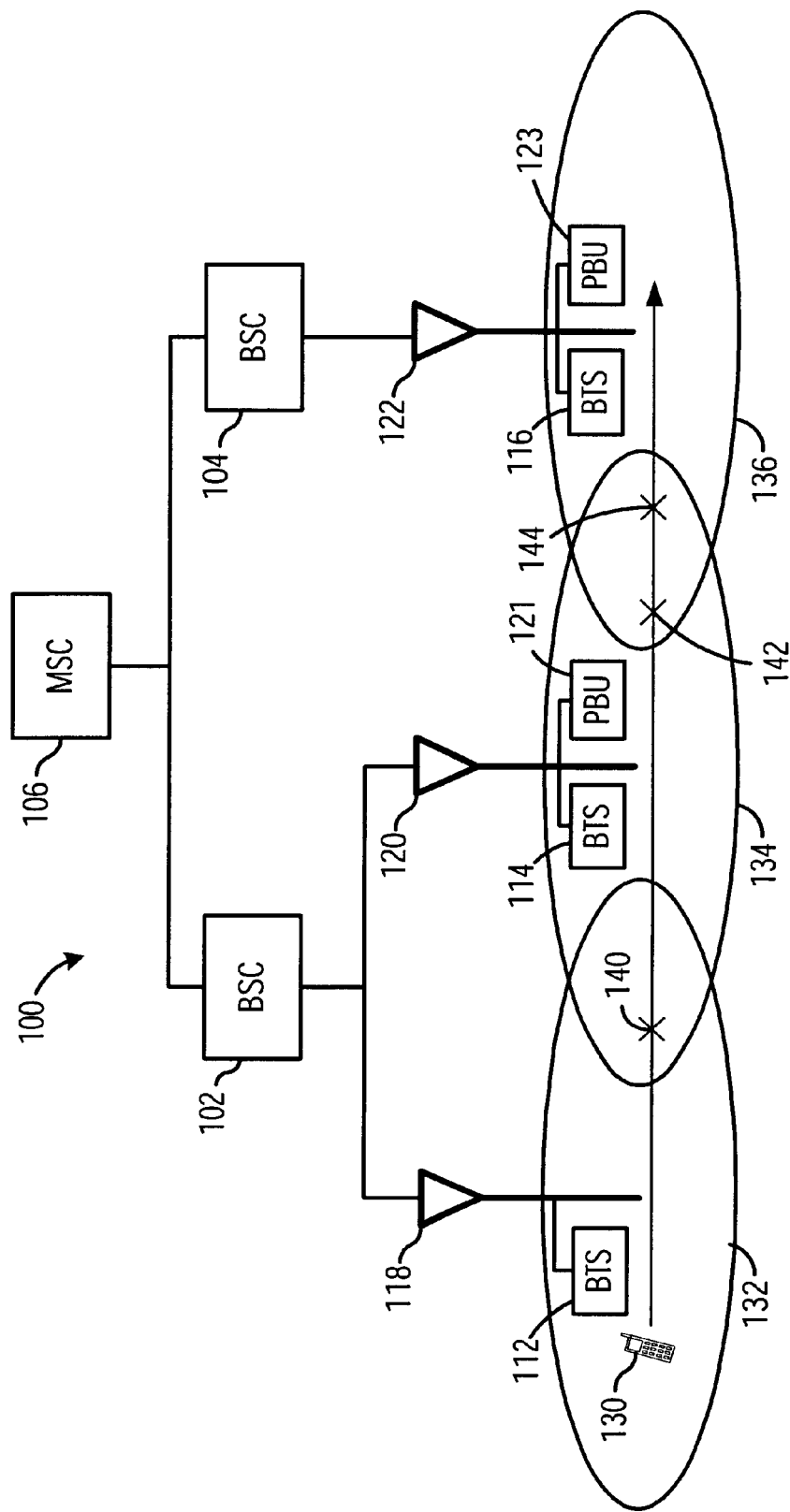
FIG. 1 schematically depicts the typical network environment that embodies the present invention.
Figure 2:
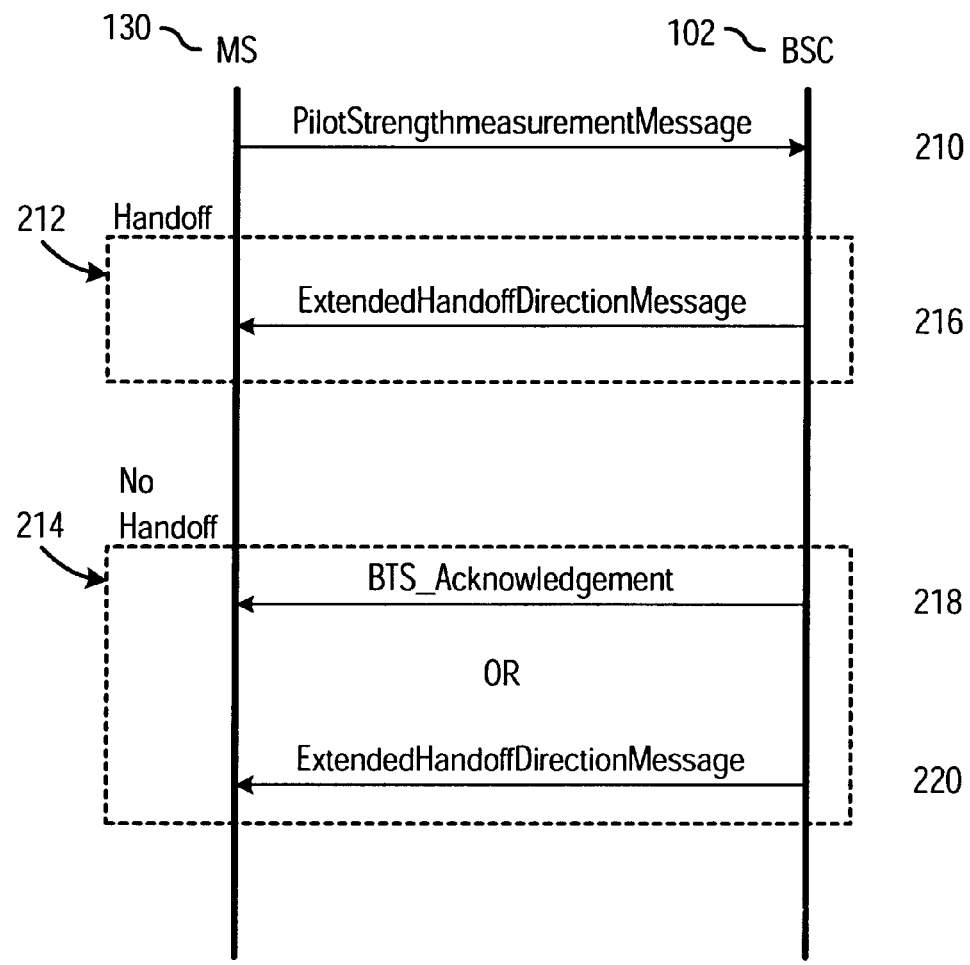
FIG. 2 is a message flow diagram illustrating one embodiment in which the mobile station requests handoff and the base station controller determines if handoff is to occur.
Figure 3:
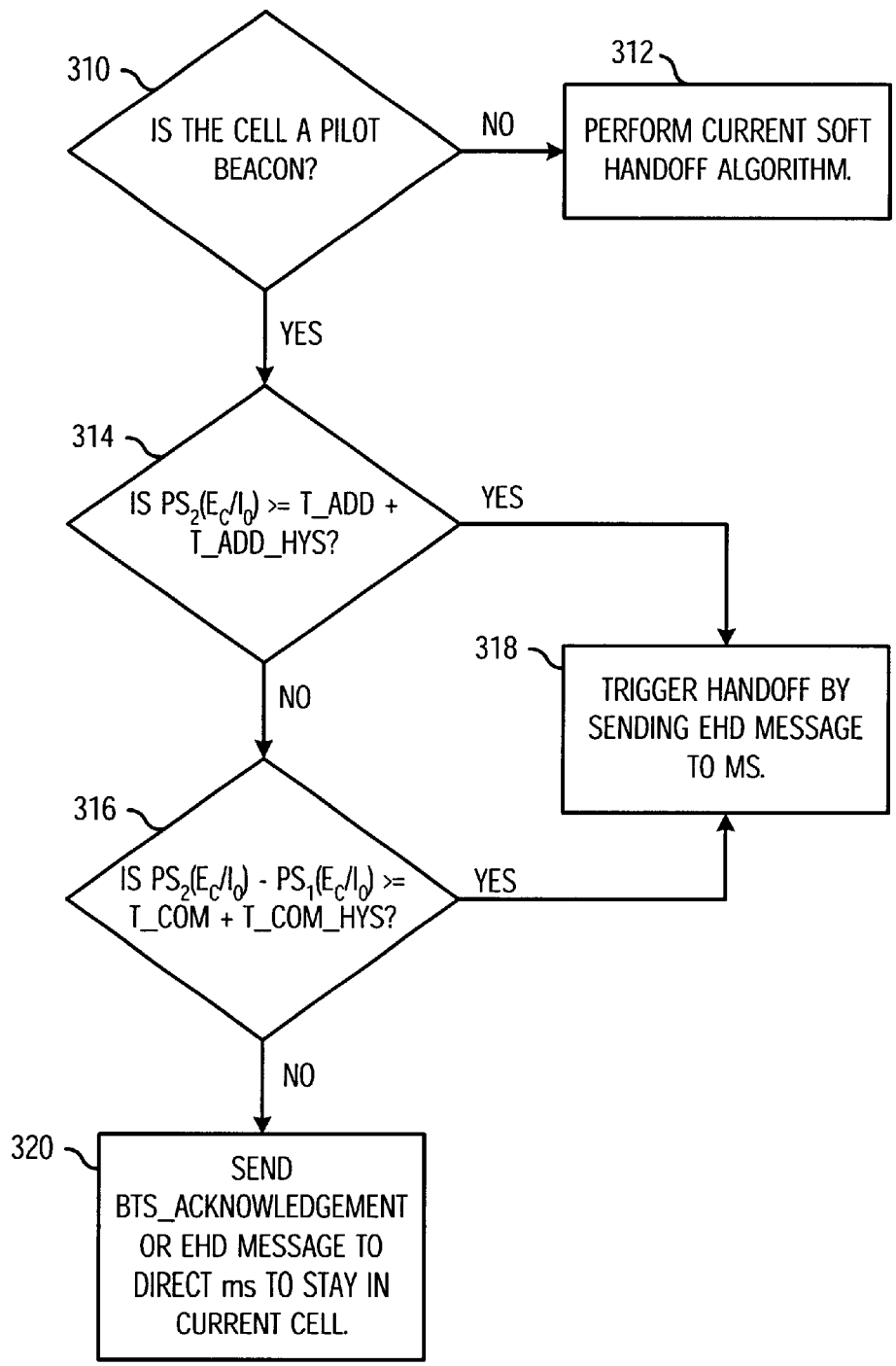
FIG. 3 is a flow chart illustrating one embodiment in which handoff from one antenna to a second antenna is determined.

The principles of the present invention and their advantages are best understood by referring to the illustrated embodiment depicted in FIGS. 1–3.

Referring to FIG. 1 of the drawings, the reference numeral 100 generally designates a wireless communication system, which embodies features of the present invention. BSC 102 is coupled to MSC 106 and BTSs 112 and 114. Similarly, BSC 104 is coupled to MSC 106 and BTS 116. Although an MSC is typically coupled to more than two BSCs, only two BSCs are shown for purposes of illustration. BTSs 112 and 114 are each configured with one antenna 118 and 120, respectively. Each of the antennae 118 and 120 is shown, for purposes of illustration, having a generally concentric service area 132 and 134. Similarly, BTS 116 is configured with one antenna 122, also for purposes of illustration, having a generally concentric service area 136.

Optionally, BTSs 114 and 116 are co-located with pilot beacons 121 and 123, respectively, for the purpose of transmitting pilot signals and directing the MS to a supported frequency for continued communications. Generally, pilot beacon 121 transmits via antenna 120 a pilot signal $PS_{120}$, and pilot beacon 123 transmits via antenna 122 a pilot signal $PS_{122}$. Other sources of pilot signals, however, are available, such as the use of a pilot channel of the CDMA forward channel. Furthermore, for the sake of brevity, the antenna will be referred to as transmitting the signals and communicating with the MS. It is well known to a person of ordinary skill in the art that the antenna together with the BTS and/or pilot beacon unit transmits the signal.

Other components, such as base transceiver station controllers, additional BSCs and MSCs, connectivity to the PSTN, and the like, necessary for the operation of the present invention are well known to a person of ordinary skill in the art, and are, therefore, not shown or discussed. Additionally, other configurations, such as a BTS with three antennae, and the like, are considered well known to a person of ordinary skill in the art and are to be included in the present invention. Furthermore, configurations other than that illustrated requiring hard handoffs, such as handoffs between sectors of the same BTS utilizing different carrier frequencies, between BTSs controlled by different BSCs utilizing the same or different carrier frequencies, between BTSs controlled by different BSCs and MSCs utilizing the same or different carrier frequencies, and the like, are well known to a person of ordinary skill in the art and are to be included in the present invention.

In one embodiment of the present invention, the mobile station (MS) 130 travels from service area 132 through service area 134 and into service area 136. As the MS 130 travels as described, communications with the MS 130 is handed off from antenna 118 to antenna 120, and then to antenna 122. Furthermore, for purposes of illustration, it is assumed that the handoff from antenna 118 to antenna 120 is a soft handoff, e.g., the MS 130 will communicate with antennae 118 and 120 on the same carrier frequency, and that the handoff from antenna 120 to antenna 122 is a hard handoff, e.g., the MS 130 will switch from communicating with antenna 120 on carrier frequency $f_1$ to communicating with antenna 122 on carrier frequency $f_2$. While the hard handoff described above depicts a situation in which the carrier frequencies differ between antenna 120 and antenna 122, the present invention applies equally to hard handoffs in which antenna 120 and antenna 122 communicates user data with the MS 130 on the same carrier frequency.

Whether to initiate a handoff is generally determined by monitoring a pilot signal from a second antenna relative to or received by the MS 130 and handing off when the pilot signal strength from the second antenna relative to or received by the MS 130 is of an acceptable level. For instance, if MS 130 is in communication with antenna 118 but is traveling toward antenna 120 such that the MS 130 will be leaving the service area of antenna 118, the MS 130 monitors the pilot signal strength of antenna 120, $PS_{120}(E_c/I_0)$ and will switch to antenna 120 when $PS_{120}(E_c/I_0)$ reaches a predetermined level. Similarly, the MS 130 monitors the pilot signal from antenna 122 and will switch to communicating with antenna 122 when $PS_{122}(E_c/I_0)$ received therefrom is of sufficient strength.

Soft handoff from antenna 118 to antenna 120 generally occurs at the desired signal strength of soft handoff 140.

Initiation of soft handoff is dynamically determined or prompted by the MS 130 in reference to T_ADD and T_COM values or system parameters, and the pilot signal strengths of adjacent antennae relative or received by to the MS 130. If the same parameters were used exclusively for hard handoffs, hard handoffs would occur at a comparable location given similar conditions, such as a distorted signal strength of hard handoff 142. The desired signal strength of hard handoff 144, however, may be reached at a different location relative to the pilot signal strengths of the adjacent antennae. As a result, it is preferred that the system operator be provided a method to adjust hard and soft handoffs individually in order to better provide consistent coverage in a geographic area.

The preferred embodiment provides the service provider with two hysterisis parameters, T_ADD_HYS and T_COM_HYS, in addition to the standard system parameters T_ADD and T_COM. Preferably, T_ADD and T_COM system parameters are used for soft handoffs and the T_ADD_HYS and T_COM_HYS parameters are added as an offset to the system parameters T_ADD and T_COM, respectively, for hard handoffs. Preferably, the range of values for T_ADD_HYS and T_COM_HYS range from -20 dB to 20 dB.

Alternatively, however, the system parameters T_ADD and T_COM are used for hard handoffs and the T_ADD_HYS and T_COM_HYS hysterisis parameters are added as an offset to the system parameters T_ADD and T_COM, respectively, for soft handoffs. Additionally, a combination thereof may also be used, such as using the system parameter T_ADD and the sum of the system parameter T_COM and the hysterisis parameter T_COM_HYS for assisting in hard handoffs and using the system parameter T_COM and the sum of the system parameter T_ADD and the hysterisis parameter T_ADD_HYS for assisting in soft handoffs, and vice versa.

Preferably, the parameters T_ADD_HYS and T_COM_HYS are contained in a component other than the MS 130, and, preferably, contained in the BSC 102. By locating the parameters in the BSC 102 as opposed to the MS 130, the communication between the BSC 102 and the MS 130 remains consistent with prevailing CDMA standards. The adjustment and control of hard and soft handoffs are controlled by the BSC 102 and the associated management and control system of the telecommunications network, as desired by the system operator.

Using the above-described scenario, the MS 130 requests soft handoff from antenna 118 to antenna 120 when either $PS_{120}(E_c/I_0)$ is greater than or equal to the system parameter T_ADD or the difference between $PS_{120}(E_c/I_0)$ and $PS_{118}(E_c/I_0)$ is greater than or equal to the system parameter T_COM*0.5 dB. Generally, if either of these conditions are met the BSC 102 performs the normal soft handoff procedures, which are well known in the art and will not be discussed in further detail. In this situation, T_ADD and T_COM are adjusted such that soft handoff occurs at the desired signal strength of soft handoff 140.

Likewise, the MS 130 generally requests hard handoff under similar conditions as above for soft handoffs, i.e., when either $PS_{122}(E_c/I_0)$ from antenna 122 is greater than or equal to the system parameter T_ADD or the difference between $PS_{122}(E_c/I_0)$ and $PS_{120}(E_c/I_0)$ is greater than or equal to the system parameter T_COM*0.5 dB. The BSC 102, however, triggers hard handoff from antenna 120 to antenna 122 when either $PS_{122}(E_c/I_0)$ is greater than or equal to the system parameter T_ADD plus the parameter T_ADD_HYS or the difference between $PS_{122}(E_c/I_0)$ and $PS_{120}(E_c/I_0)$ is greater than or equal to the system parameter T_COM*0.5 dB plus the parameter T_COM_HYS. If neither condition is met, the BSC 102 requests the MS 130 to delay handoff. If either condition is met, however, the BSC 102 triggers the MS 130 to complete handoff. Alternatively, a component other than the BSC 102, such as an MSC 106, a BTS 112, and the like, may determine if a handoff is appropriate and trigger the MS 130 to perform the handoff.

In this situation, T_ADD and T_COM retain the values to maintain the desired signal strength of soft handoff 140 as described above. T_ADD_HYS and T_COM_HYS, however, act as an offset to obtain the desired signal strength of hard handoff 144. The inclusion of the offsets T_ADD_HYS and T_COM_HYS in the case of hard handoffs, therefore, provide system operators the ability to optimize the system for both hard and soft handoffs individually.

FIG. 2 illustrates the preferred message flow embodying the present invention during handoffs. A first pilot signal is transmitted by the antenna 120 and a second pilot signal is transmitted by the antenna 122, both of which are received by the MS 130. The MS compares the strength of the second pilot signal to the system parameters T_ADD and T_COM. If the strength of the first pilot signal is greater than or equal to T_ADD, or the difference between the strength of the first pilot signal and the strength of the second pilot signal is greater than or equal to T_COM, then the MS 130 transmits a PilotStrengthMeasurementMessage (PSMM) message 210 to the BSC 102 via the BTS 114 (not shown). If the BSC 102 determines that a handoff is necessary, the BSC 102 triggers the handoff by transmitting a group of messages 212, comprising an ExtendedHandoffDirectionMessage message 216, to the MS 130, requesting the MS 130 begin communicating with the antenna 122 corresponding to the second pilot signal. If, however, the BSC 102 determines that a handoff is not necessary 214, the BSC 102 either transmits a BTS_Acknowledgement message 218 or an ExtendedHandoffDirectionMessage message 220 requesting that the MS 130 continue communicating with the antenna 120. The content and procedure for transmitting the PSMM message 210, the ExtendedHandoffDirectionMessage message 216 and 220, and the BTS_Acknowledgement message 218 are well known to a person of ordinary skill in the art and, therefore, are not described in further detail.

FIG. 3 illustrates the procedure the BSC 102 preferably performs to determine whether a handoff from a first antenna to a second antenna is appropriate. Alternatively, either the MSC 106 and/or BTS 114 may perform the illustrated procedure. Initially, in step 310, the BSC 102 determines whether the cell type from which a pilot signal has been received is a pilot beacon. Generally, the cell type from which a pilot signal is received will be a pilot beacon if the cell is controlled by a different BSC utilizing the same carrier frequency, commonly referred to as a logical pilot beacon, or the cell is controlled by a different BSC utilizing a different carrier frequency. The procedure for determining the cell type is well known to a person of ordinary skill in the art and, therefore, is not described in further detail.

If the cell type is not a pilot beacon, the BSC in step 312 performs the typical soft handoff procedures, which are well known to a person of ordinary skill in the art. If the cell type is a pilot beacon, however, in step 314 the BSC 102 determines whether pilot signal strength of: the second antenna, $PS_2(E_c/I_0)$, is greater than or equal to the system parameter T_ADD plus the system parameter T_ADD_HYS. If not, in step 316 the BSC 102 determines whether the difference between $PS_2(E_c/I_0)$ and pilot signal strength of the first antenna $PS_1(E_c/I_0)$ is greater than or equal to the system parameter T_COM*0.5 dB plus the system parameter T_COM_HYS. If either of these conditions are met, in step 318 the BSC 102 transmits via antenna an ExtendedHandoffDirectionMessage message 216 to the MS 130 to direct the MS 130 to handoff to the second antenna from the first antenna. Otherwise, in step 320 the BSC 102 transmits via antenna either a BTS_Acknowledgement message 218 or an ExtendedHandoffDirectionMessage message 220 to the MS to direct the MS to delay handoff.

It is understood that the present invention can take many forms and embodiments. Accordingly, several variations may be made in the foregoing without departing from the spirit or the scope of the invention. For example, architectures with differing antenna configurations or sources of pilot signals may be used without negating the novelty or usefulness of other aspects of the invention. Moreover, while the above description described the invention in terms of a pilot signal, other sources of signals may be used, such as the signal strength of a traffic channel.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A system for handing off communications with a mobile station from a first antenna to a second antenna, the system comprising:
    a first handoff mechanism for switching between the first antenna and the second antenna when at least one or both of the strength of the signal from the second antenna relative to the mobile station is greater than or equal to a first system parameter, and the difference between the strength of the signal from the second antenna relative to the mobile station and the strength of the signal from the first antenna relative to the mobile station is greater than or equal to a second system parameter; and
    a second handoff mechanism for switching between the first antenna and the second antenna when the difference between the strength of the signal from the second antenna relative to the mobile station and the strength of the signal from the first antenna relative to the mobile station is greater than or equal to the second system parameter plus a second hysterisis parameter.

2. The system of claim 1, wherein the first handoff mechanism initiates at least one of a hard handoff and a soft handoff.

3. The system of claim 1, wherein the second handoff mechanism initiates at least one of a hard handoff and a soft handoff.

4. The system of claim 1, wherein the first handoff mechanism is triggered by at least one of a base station transceiver, a base station controller, a mobile switching center, and a mobile station.

5. The system of claim 1, wherein the second handoff mechanism is triggered by at least one of a base station transceiver, a base station controller, a mobile switching center, and a mobile station.

6. The system of claim 1, wherein the signal of the first antenna comprises a pilot signal from the first antenna.

7. The system of claim 1, wherein the signal of the second antenna comprises a pilot signal from the second antenna.

8. The system of claim 1, wherein the first antenna comprises a pilot beacon unit.

9. The system of claim 1, wherein the second antenna comprises a pilot beacon unit.

10. The system of claim 1, wherein the first system parameter comprises at least one of T_ADD and T_COM.

11. The system of claim 1, wherein the second system parameter comprises at least one of T_ADD and T_COM.

12. The system of claim 1, wherein the first antenna operates on a first carrier frequency and the second antenna operates on the first carrier frequency.

13. The system of claim 1, wherein the first antenna operates on a first carrier frequency, the second antenna operates on the first carrier frequency, and the signal is transmitted by a base transceiver station.

14. The system of claim 1, wherein the first antenna operates on a first carrier frequency and the second antenna operates on a second carrier frequency.

15. The system of claim 1, wherein the first antenna operates on a first carrier frequency, the second antenna operates on a second carrier frequency, and the signal from the second antenna is transmitted by a pilot beacon unit.

16. The system of claim 1, wherein the first antenna and the second antenna corresponds to a first sector and a second sector of a base transceiver station.

17. A system for handing off communications with a mobile station from a first antenna to a second antenna, the system comprising:
    a first handoff mechanism for changing signal transmission/reception between the first antenna and the second antenna when at least one or both of the strength of the signal from the second antenna relative to the mobile station is greater than or equal to a first system parameter plus a first hysterisis parameter, and the difference between the strength of the signal from the second antenna relative to the mobile station and the strength of the signal from the first antenna relative to the mobile station is greater than or equal to a second system parameter; and
    a second handoff mechanism for changing signal transmission/reception between the first antenna and the second antenna when the difference between the strength of the signal from the second antenna relative to the mobile station and the strength of the signal from the first antenna relative to the mobile station is greater than or equal to the second system parameter plus a second hysterisis parameter.

18. The system of claim 17, wherein the first handoff mechanism initiates at least one of a hard handoff and a soft handoff.

19. The system of claim 17, wherein the second handoff mechanism initiates at least one of a hard handoff and a soft handoff.

20. The system of claim 17, wherein the first handoff mechanism is triggered by at least one of a base station transceiver, a base station controller, a mobile switching center, and a mobile station.

21. The system of claim 17, wherein the second handoff mechanism is triggered by at least one of a base station transceiver, a base station controller, a mobile switching center, and a mobile station.

22. The system of claim 17, wherein the signal of the first antenna comprises a pilot signal from the first antenna.

23. The system of claim 17, wherein the signal of the second antenna comprises a pilot signal from the second antenna.

24. The system of claim 17, wherein the first antenna comprises a pilot beacon unit.

25. The system of claim 17, wherein the second antenna comprises a pilot beacon unit.

26. The system of claim 17, wherein the first system parameter comprises at least one of T_ADD and T_COM.

27. The system of claim 17, wherein the second system parameter comprises at least one of T_ADD and T_COM.

28. The system of claim 17, wherein the first antenna operates on a first carrier frequency and the second antenna operates on the first carrier frequency.

29. The system of claim 17, wherein the first antenna operates on a first carrier frequency, the second antenna operates on the first carrier frequency, and the signal is transmitted by a base transceiver station.

30. The system of claim 17, wherein the first antenna operates on a first carrier frequency and the second antenna operates on a second carrier frequency.

31. The system of claim 17, wherein the first antenna operates on a first carrier frequency, the second antenna operates on a second carrier frequency, and the signal from the second antenna is transmitted by a pilot beacon unit.

32. The system of claim 17, wherein the first antenna and the second antenna corresponds to a first sector and a second sector of a base transceiver station.

33. A system for handing off communications with a mobile station from a first antenna to a second antenna, the system comprising:

a first handoff mechanism for switching between the first antenna and the second antenna when at least one or both of the strength of the signal from the second antenna relative to the mobile station is greater than or equal to a first system parameter, and the difference between the strength of the signal from the second antenna relative to the mobile station and the strength of the signal from the first antenna relative to the mobile station is greater than or equal to a second system parameter; and a second handoff mechanism for switching between the first antenna and the second antenna when both the strength of the signal from the second antenna relative to the mobile station is greater than or equal to the first system parameter plus a first hysteresis parameter, and the difference between the strength of the signal from the second antenna relative to the mobile station and the strength of the signal from the first antenna relative to the mobile station is greater than or equal to the second system parameter plus a second hysterisis parameter.

34. A system for handing off communications with a mobile station from a first antenna to a second antenna, the system comprising:

a first handoff mechanism for changing signal transmission/reception between the first antenna and the second antenna when at least one or both of the strength of the signal from the second antenna relative to the mobile station is greater than or equal to a first system parameter plus a first hysteresis parameter, and the difference between the strength of the signal from the second antenna relative to the mobile station and the strength of the signal from the first antenna relative to the mobile station is greater than or equal to a second system parameter; and a second handoff mechanism for changing signal transmission/reception between the first antenna and the second antenna both the strength of the signal from the second antenna relative to the mobile station is greater than or equal to the first system parameter, and the difference between the strength of the signal from the second antenna relative to the mobile station and the strength of the signal from the first antenna relative to the mobile station is greater than or equal to the second system parameter plus a second hysterisis parameter.

* * * * *